Nov. 18, 1958  W. BAUER  2,860,856
INSTALLATION FOR SPRAYING FOAM MATERIALS
Filed Aug. 20, 1954
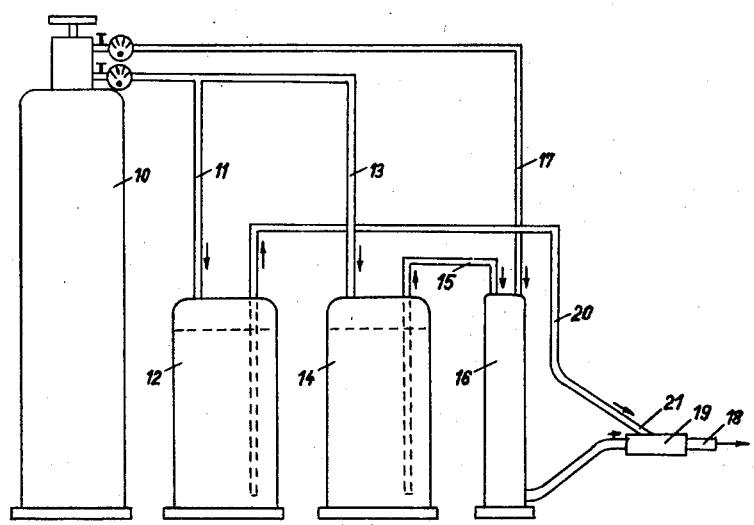
Inventor
Wilhelm Bauer
By Richard Ernst
Ag't

# 2,860,856

Patented Nov. 18, 1958

2,860,856
INSTALLATION FOR SPRAYING FOAM MATERIALS

Wilhelm Bauer, Essen, Germany

Application August 20, 1954, Serial No. 451,205

Claims priority, application Germany August 20, 1953

1 Claim. (Cl. 259—4)

This invention relates to an installation for spraying foamed materials.

For insulation against sound, heat and cold, there are plates known which are produced by heating a solution of a foam-forming substance, adding an aqueous solution of a synthetic resin to the produced foam while beating it, and by allowing the foamed material to solidify in forms. Such a foam containing a synthetic resin cannot be sprayed because it hardens too quickly.

The present invention provides an installation, with the aid of which a hardening agent is added to a solution in foam form after the solution has left that part of the installation, in which the foam has been formed, that is, the hardening agent is added closely at a spraying nozzle provided in the installation. Preferably, there may be provided a mixing chamber at the point of the entrance of the hardening agent.

A catalyst for the basic material of the hardening agent, for instance, a partial condensate of urea—formaldehyde in aqueous solution, may be contained in the solution of the foam material.

The hardening agent is admixed immediately before the material is sprayed, so that the hardening agent is not present in the space in which the foam is formed. Any hardening and therefore any clogging inside the apparatus is thus prevented.

The admixture of the hardening agent to the foam may take place in a direction opposite to the current of the foam.

It is of advantage to arrange the entrance of the hardening agent, with respect to the flow of the foam, angularly, preferably under an acute angle. Thus, the flow of the foam and of the hardening agent continues practically in the same directions.

A particularly intimate mixture is obtained by using a spiral mixing nozzle for introducing the hardening agent into the foam current.

The specification is accompanied by a drawing, the single figure of which illustrates schematically the installation of the invention.

The installation is operated by compressed air supplied from the bottle 10. From this bottle, a conduit line 11 leads to the reservoir 12 containing a solution of a hardening agent, and a conduit 13 leads to a container 14 containing a solution of spraying material to be formed into foam. The container 14 is connected by a line 15 with a container 16 wherein the foam is formed with the aid of compressed air introduced through the line 17.

The foam thus prepared is led to a mixing chamber 19 arranged before a spraying nozzle 18. The conduit 20 which leads the hardening agent from the reservoir 12 to the mixing chamber enters the mixing chamber at an acute angle. The introduction may take place by way of a spiral mixing nozzle 21. The mixture produced in the mixing chamber 19 may be sprayed through the spraying nozzle 18 or if desired through any other suitable device connected with the nozzle 18.

I claim:

Installation for preparing and spraying foam, comprising a compressed air source, a first closed container adapted to hold a solution of a foam-forming spraying material, a second closed container adapted to hold a solution of a hardening agent for the spraying material when in foamed form, a third closed container to form foam therein, a mixing chamber, a spraying device associated with the mixing chamber, a first system of conduits, and a second system of conduits, the first system of conduits including a line leading from said air source to the first container, a line from the first container to the third container, a line from the air source to the third container, and a line from the third container to the mixing chamber, the second system of conduits including a line connecting the air source and the second container, and a line connecting the second container and the mixing chamber, the third container thus having two inlets and an outlet and being of considerably larger cross sectional area than the inlets and outlet communicating with the third container and having considerable volume so that sufficient space is provided in the container for the foam formation.

References Cited in the file of this patent

UNITED STATES PATENTS

| | | |
|---|---|---|
| 1,829,714 | McElroy et al. | Oct. 27, 1931 |
| 1,849,945 | Mobley et al. | Mar. 15, 1932 |
| 2,478,013 | Roddy | Aug. 2, 1949 |
| 2,673,723 | Keen | Mar. 30, 1954 |
| 2,685,436 | Hasselquist | Aug. 3, 1954 |